(12) United States Patent
Rathonyi et al.

(10) Patent No.: US 6,359,877 B1
(45) Date of Patent: Mar. 19, 2002

(54) METHOD AND APPARATUS FOR MINIMIZING OVERHEAD IN A COMMUNICATION SYSTEM

(75) Inventors: Béla Stefan Kazmir Rathonyi, Malmö; Farooq Ullah Khan, Kista; Håkan Gunnar Olofsson, Stockholm, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/120,163

(22) Filed: Jul. 21, 1998

(51) Int. Cl.$^7$ .............................................. H04Q 11/04
(52) U.S. Cl. ...................... 370/349; 370/232; 370/252; 370/389; 370/391; 370/394; 375/220; 709/237; 709/250; 714/748
(58) Field of Search .................. 370/391, 312, 370/394, 399, 422, 216, 320, 392, 477, 242, 256, 236, 471, 322, 349, 221, 359, 494, 232, 252, 389, 395; 710/129; 709/223, 228, 245, 250, 224, 231, 229, 233, 203, 237, 239; 725/67, 48; 348/423.1, 461; 455/427, 557, 419, 424; 386/112; 375/132, 222, 354, 220; 714/748, 799, 233, 794, 227, 704

(56) References Cited

U.S. PATENT DOCUMENTS

| | | | | |
|---|---|---|---|---|
| 4,691,314 A | * | 9/1987 | Bergins et al. | 370/471 |
| 4,970,714 A | * | 11/1990 | Chen et al. | 370/216 |
| 5,121,387 A | * | 6/1992 | Gerhardt et al. | 370/322 |
| 5,128,934 A | * | 7/1992 | Jasinki | 370/312 |
| 5,222,101 A | * | 6/1993 | Ariyavisitakul et al. | 375/231 |
| 5,353,332 A | | 10/1994 | Raith et al. | 455/455 |
| 5,629,948 A | | 5/1997 | Hagiwara et al. | 714/748 |
| 5,648,970 A | * | 7/1997 | Kapoor | 370/394 |
| 5,979,085 A | * | 8/1998 | Beuk et al. | 455/88 |
| 6,034,962 A | * | 3/2000 | Ohno et al. | 370/399 |
| 6,018,520 A | * | 6/2000 | Okada | 370/336 |
| 6,078,568 A | * | 6/2000 | Wright et al. | 370/312 |
| 6,105,064 A | * | 8/2000 | Davis et al. | 709/224 |

FOREIGN PATENT DOCUMENTS

EP 0751639 A1 * 1/1997 ............ H04H/1/00

OTHER PUBLICATIONS

Furuskär, Anders et al., "System Performance of EDGE, a Proposal for Enhanced Data Rates in Existing Digital Cellular Systems", *Ericsson Radio Systems AB*, pp1–6.

* cited by examiner

Primary Examiner—Douglas Olms
Assistant Examiner—Shick Hom
(74) Attorney, Agent, or Firm—Burns, Doane, Swecker & Mathis, L.L.P.

(57) ABSTRACT

A method and apparatus are provided for minimizing overhead in packet re-transmission in a communication system. Each packet is given a sequence number, based on a current transmission rate, the size of the packet, and a previously assigned sequence number. The packet size can be adapted so that the entire packet fits into a single transmission block. The packet size may also be adapted based on throughput. The packet size may be adapted based on the transmission rate and/or throughput, whether the packet is being transmitted the first time or if it is being re-transmitted. Alternately, if the packet is being re-transmitted, the packet is transmitted at its original transmission rate, regardless of the current transmission rate.

16 Claims, 10 Drawing Sheets

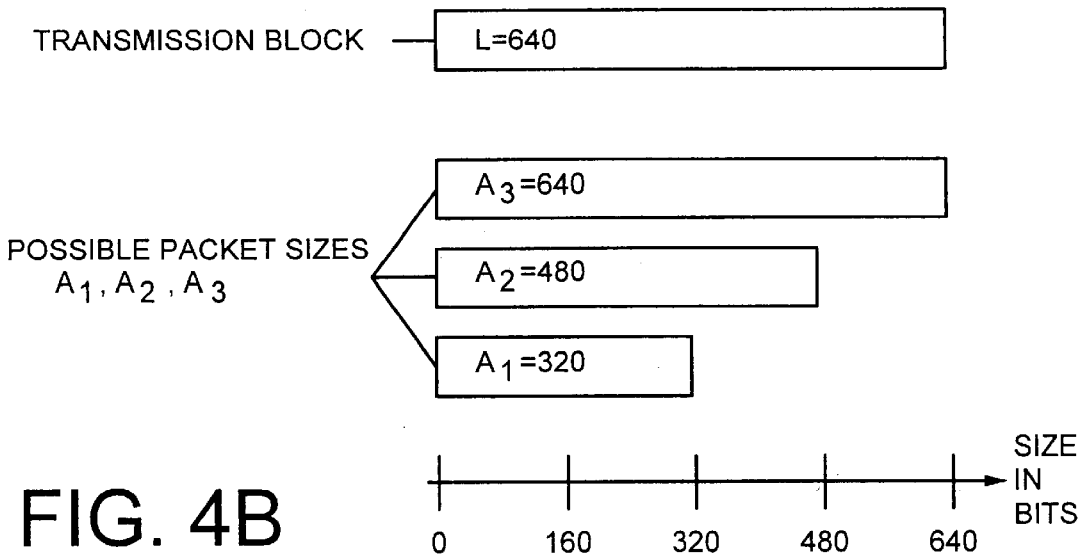

FIG. 4B

405: j=0, A[0]=0, A[1]=320, A[2]=480, A[3]=640, A[4]=640
410: first=0
420: i=0, CRC_RESET()
425: ? 1=<3 =>TRUE
430: ? 320=<640 =>TRUE
435: ? CRC_CHECK(0,320) => FALSE /* THE 320 FIRST BITS IS FED TO THE LFSR */
425: ? 2=<3 =>TRUE
430: ? 480=<640 => TRUE
435: ? CRC_CHECK(320,160)=> FALSE /* 160 BITS SITUATED JUST AFTER THE FIRST 320 IS FED TO THE LFSR */
425: ? 3=<3 => TRUE
430: ? 640<640 => FALSE
450: ? 0<640 => TRUE
455: ? CRC_CHECK(480,160) =>FALSE /* 160 BITS SITUATED JUST AFTER THE FIRST 480 IS FEDTO THE LFSR */
465: ? 0==640 => FALSE
470: j=1
410: first=320
420: i=0, CRC_RESET()
425: ? 1=<3 => TRUE
430: ? 320<320 =>FALSE
450: ? 320<640 => TRUE
455: ? CRC_CHECK(320,320)=>TRUE /* 320 BITS SITUATED JUST AFTER THE FIRST 320 IS FED TO THE LFSR */
460: RELEASE(320,320) /* I.E. RELEASE THE SECOND PACKET BECAUSE THIS WAS ERROR FREE */
480: /* DONE */

FIG. 4C

METHOD AND APPARATUS FOR MINIMIZING OVERHEAD IN A COMMUNICATION SYSTEM

BACKGROUND

This invention relates generally to a method and apparatus for minimizing overhead in a communication system. More particularly, this invention relates to a method and apparatus for minimizing overhead in packet re-transmission in a communication system.

FIG. 1 is a block diagram of an exemplary cellular radiotelephone system, including an exemplary base station 110 and a mobile station 120. Although denoted a "mobile station", the station 120 may also be a fixed cellular station. The base station includes a control and processing unit 130 which is connected to the a mobile switching center (MSC) 140 which in turn is connected to a PSTN (not shown). General aspects of such cellular radiotelephone systems are known in the art. The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with control and traffic channels that share the same radio carrier.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

Modern communication systems, such as cellular and satellite radio systems, employ various modes of operation (analog, digital, dual mode, etc.), and access techniques such as frequency division multiple access (FDMA), time division multiple access (TDMA), code division multiple access (CDMA), and hybrids of these techniques.

In North America, a digital cellular radiotelephone system using TDMA is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using direct sequence CDMA is specified by the TIA/EIA/IS-95 standard, and a frequency hopping CDMA communication system is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB). Besides transmitting voice information, the next generation systems can be expected to carry packet data and to inter-operate with packet data networks that are also usually designed and based on industry-wide data standards such as the open system interface (OSI) model or the transmission control protocol/Internet protocol (TCP/IP) stack. These standards have been developed, whether formally or de facto, for many years, and the applications that use these protocols are readily available. The main objective of standards-based networks is to achieve interconnectivity with other networks. The Internet is today's most obvious example of such a standards-based packet data network in pursuit of this goal.

Advantages of introducing a packet data protocol in cellular systems include the ability to support high data rate transmissions and at the same time achieve a flexibility and efficient utilization of the radio frequency bandwidth over the radio interface. General Packet Radio Service (GPRS), which is the packet mode for the Global System for Mobile Communication (GSM) standard, is designed for so-called "multislot operations" where a single user is allowed to occupy more than one transmission resource simultaneously.

An overview of the GPRS network architecture is illustrated in FIG. 2A. Information packets from external networks enter the GPRS network at a GGSN (Gateway GPRS Service Node) 10. A packet is then routed from the GGSN via a backbone network, 12, to a SGSN (Serving GPRS Support Node), 14, that is serving the area in which the addressed GPRS remote station resides. From the SGSN 14, the packets are routed to the correct BSS (Base Station System), in a dedicated GPRS transmission. The BSS includes a plurality of base transceiver stations (BTS), only one of which, BTS 18, is shown and a base station controller (BSC) 20. The interface between the BTSs and the BSCs are referred to as the A-bis interface. The BSC is a GSM specific denotation, and for other exemplary systems the term Radio Network Control (RNC) is used for a node having similar functionality as that of a BSC. Packets are then transmitted by the BTS 18 over the air interface to a remote station 21 using a selected information transmission rate.

A GPRS register holds all GPRS subscription data. The GPRS register may, or may not, be integrated with the HLR (Home Location Register) 22 of the GSM system. Subscriber data may be interchanged between the SGSN and the MSC/VLR 24 to ensure service interaction, such as restricted roaming. The access network interface between the BSC 20 and MSC/VLR 24 is a standard interface known as the A-interface, which is based on the Mobile Application Part of CCITT Signaling System No. 7. The MSC/VLR 24 also provides access to the land-line system via PSTN 26.

In most digital communication systems, communication channels are implemented by frequency modulating radio carrier signals, which have frequencies near 800 megahertz (MHZ), 900 MHZ, and 1900 MHZ. In TDMA systems and even to varying extents in CDMA systems, each radio channel is divided into a series of time slots, each of which contains a burst of information from a user. The time slots are grouped into successive frames that each have a predetermined duration, and successive frames may be grouped into a succession of what are usually called superframes. This kind of access technique (e.g., TDMA or CDMA) used by a communication system affects how user information is represented in the slots and frames, but current access techniques all use a slot/frame structure.

Time slots assigned to the same user, which may not be consecutive time slots on the radio carrier, may be considered a logical channel assigned to the user. During each time slot, a predetermined number of digital bits are transmitted according to the particular access technique (e.g., CDMA) used by the system. In addition to logical channels for voice or data traffic, cellular radio communication systems also provide logical channels for control messages, such as paging/access channels for call-setup messages exchanged by base stations and mobile stations. In general, the transmission bit rates of these different channels need not coincide, and the lengths of the slots in the different channels need not be uniform. The set of possible transmission bit rates for a channel is typically a limited integer value and is known to both the transmitter and the receiver which use that channel.

In cellular radio systems, an air interface protocol is required in order to allow a mobile station to communicate with the base stations and a mobile switching center (MSC). The air interface protocol is used to initiate and to receive cellular telephone calls. A physical layer (Layer 1) defines the parameters of the physical communications channel, e.g., carrier radio frequency spacing, modulation characteristics, etc. A link layer (Layer 2) defines the techniques necessary for the accurate transmission of information within the constraints of the physical channel, e.g., error correction and detection, etc. A Radio Resource Control (RRC) Layer 3 defines the procedures for reception and processing of information transmitted over the physical channels. TIA/EIA/IS-136 and TIA/EIA/IS-95 for example specify air interface protocols. The functionality of a Layer 2 protocol includes the delimiting, or framing, of Layer 3 messages, which may be sent between communicating Layer 3 peer entities residing within mobile stations and cellular switching systems.

The physical channel between the remote station and the base station is typically divided into time frames, as illustrated in FIG. 2B. The information unit transmitted during a time frame can be called a transmission block. In the next generation systems, data can be grouped into packets for transmission. One or several data packets can be transmitted within a transmission block.

A feature of many communication systems is that the rates at which both the remote station and the base station can transmit user information bits can be different for different channels in the system and can change from time to time even within a channel, for example in response to changes in the amount of information to be transmitted. The transmission rate is sometimes permitted to change only at the beginnings of frames and must keep a constant value throughout an entire frame. Thus, the size of a transmission block can vary from frame to frame, depending on the transmission rate for a particular frame. This is typical of the third generation system currently being considered by ETSI and ARIB. A remote station is allocated a set of different speeds that can be used for the transmission of information bits. The base station controls the allocation of the speed for each channel and sends messages to the remote station to inform the mobile station which transmission rates it is allowed to use. Such a message can be sent by a base station in each frame it transmits.

How the transmission rate is changed depends on the system. For example, in a TDMA system, the different number of time slots allocated for a user may be varied in time. Also, different modulation and coding schemes can result in different transmission rates, as disclosed, for example, in commonly assigned U.S. patent application Ser. No. 08/921,147, now U.S. Pat. No. 6,208,663, filed Aug. 29, 1997. For a CDMA system, the spreading factor can be changed to change the rate of a traffic channel. This is a proposal in the developing IMT2000 standard. Both in TDMA and CDMA systems, the channel coding together with the puncturing scheme, i.e. the method for choosing which bits to be discarded and the channel coder output before transmission, can also be used to obtain different rates.

It is assumed that a packet is smaller than or equal in length to a transmission block. The number of different packet sizes is assumed to be a limited integer value. The sizes of the packets depend on the transmission rate set currently used for the channel and are therefore known to both the transmitter and to the receiver. The packets are given sequence numbers and are transmitted by order of the sequence numbers within a transmission block. The assignment of sequence numbers is arbitrary and is not known to the receiver. The receiver only knows how large the total transmission block is for each received frame. Thus, no framing is needed because the receiver always knows where the transmission block starts and ends. The transmitter does not send any information about the packet composition or arrangement in the transmission block.

At the Layer 2 level, a packet typically comprises a header part, an information part (I-part), and an error detection code part. The header part typically includes information used for requesting re-transmission of corrupted packets. This re-transmission scheme is often referred to as an Automatic Retransmission Request (ARQ) scheme. The error detecting part, called the Cyclic Redundancy Code (CRC), is used to determine if the rest of the packet has been corrupted in some way when transmitted on the channel. If so, a re-transmission request signal is transmitted to the transmitter, and the original data is re-transmitted.

Hybrid ARQ schemes provide low bit error rates using redundancy. There are fixed redundancy ARQ schemes, such as the Type I hybrid ARQ scheme, and variable redundancy ARQ schemes, such as soft combining and the Type II and Type III hybrid ARQ schemes.

In soft combining, which is illustrated in FIG. 2C, a copy of the originally transmitted information is transmitted when a first decoding attempt fails. If the second decoding attempt of the originally transmitted information combined with the copy fails, a new copy of the information is transmitted in order to increase the probability of successful decoding at the receiving entity. As many re-transmissions of the same information can be performed as required, until the information is successfully decoded.

In a Type II hybrid ARQ scheme, which is illustrated in FIG. 2D, data redundancy can be increased until the received information is successfully decoded. Redundancy is increased by transmitting the systematic information from the channel encoder and, if needed, also the redundant information (generated by another generator that generates a polynomial of the code) from the channel encoder output. As shown in FIG. 2D, if a first decoding attempt fails, redundant information R1 is transmitted. If a second decoding attempt of the originally transmitted information and the redundant information R1 fails, redundant information R2 is transmitted, and so on. The Type II hybrid ARQ scheme can be further enhanced by re-transmitting the blocks received with a weak carrier to interference ratio (C/I), starting from the block received with the lowest C/I. A decoding attempt is made after diversity/soft combining of the newly transmitted information with the previously information at every block re-transmission. This process is continued until decoding is successful.

A problem with these schemes is that the previously transmitted information has to be stored so that it can be combined with the newly transmitted information for decoding. This consumes a large amount of memory.

In a Type III hybrid ARQ scheme, every sub-block is decodeable, itself. Thus, when no memory space is available, previously transmitted blocks can always be discarded.

Variable transmission rates present problems for packet re-transmission because the rate of transmission may be different than the rate of re-transmission. Techniques have been proposed to handle packet re-transmission for variable transmission rates. According to one technique, the packet sequence numbering is always incremented by one, and the packet size is always fixed as the packet size corresponding to the smallest possible rate within the set of possible transmission rates. Otherwise, it is impossible to handle re-transmissions of packets when the transmission rate is changed. This results in a lot of overhead because for higher transmission rates, the fixed data packet size is smaller than the size of the packet that can actually be transmitted. A lot of unnecessary radio resources are wasted due to this overhead.

According to another technique, a constant packet length is used, but a packet can be transmitted in several time frames using interleaving for the lower transmission rates. This introduces a large delay. In addition, this wastes channel resources because, regardless of the amount of user data, the packet size is always the same.

The channel error characteristics in a communication system vary a lot and depend, for example, on the speed of the mobile station, different reflections from objects such as buildings, mountains, etc., noise interference, cell traffic load, and the transmission rate. The channel characteristics may be different depending on the environment in which the mobile station is moving around or in which the fixed cellular station is installed. These channel characteristics affect the throughput.

In the conventional approaches described above, the packet sizes are fixed for the different transmission rates. There is no continuous evaluation of the number of re-transmitted packets and no adaptation of the size of the packets to maximize the throughput. Thus, the packet sizes will not be optimal under certain traffic channel conditions.

There are various methods known for adapting transmission rates. For example, for systems using more than one Modulation and/or Channel coding Scheme (MCS), e.g., GPRS GSM, D-AMPS++.EDGE GSM, switching to Higher Level Modulation (HLM) or less channel coding results in higher information bitrates, and vice versa. Similarly, in a Wideband CDMA (WCDMA) system, different information rates are obtained using different Transmission Formats (TF). A TF is defined by the transmission rate, code, interleaving depth, and repetition and puncturing scheme used.

For efficient transmission on the radio interface, a higher layer PDU (Protocol Data Unit) is segmented into smaller size RLC (Radio Link Control) blocks or packets. This also allows re-transmissions to be performed at the RLC block level according to an ARQ protocol which is denoted RLC Protocol (RLCP).

An RLC connection is established between two peer entities for the transmission of RLC blocks, e.g., a base station and a remote station as depicted in FIG. 1. Each entity has a receiver that receives RLC blocks and a transmitter that transmits RLC blocks. The block transmission between the two entities is controlled through a window, i.e., the maximum number of outstanding RLC blocks (unacknowledged blocks) is limited by the window size.

Two different methods are currently used to segment a block in a higher layer PDU frame into RLC blocks in systems using more than one MCS/TF. According to one method, the entire block in the higher layer PDU frame is segmented into RLC blocks of a size corresponding to the currently used MCS or TF. This makes it impossible to switch between different modes during the transmission period of a higher layer PDU frame. According to a second method, a block in a higher layer PDU frame is segmented into RLC block sizes corresponding to the lowest transmission rate. Then, an integral number of these comparatively smaller units are transmitted during a block period. Segmenting a block in a higher layer PDU frame into smaller units corresponding to the minimum transmission rate results in large overheads due to the RLC header and the CRC for small size units, e.g., 16 Kbps bearer service in a system with a frame length equal to 10 msec has a block size of only 160 bits while the overheads represent 25% of the capacity (e.g., 16 bits CRC and 24 bits RLC header). Also, this method makes it difficult to use soft combining and/or Type II hybrid ARQ because one transmission block should only contain one RLC block to support Type II hybrid ARQ and soft combining.

There is thus a need for a method an apparatus which reduces overhead in packet re-transmission. There is also a need for a method and apparatus for variable rate packet re-transmission which supports Type II hybrid ARQ and soft combining.

SUMMARY

It is therefore an object of the present invention to maximize the use of resources and reduce overhead in packet re-transmission. It is yet another object of the present invention to maximize throughput. It is still a further object of the present invention to support Type II hybrid ARQ and soft combining in variable rate packet re-transmission.

According to exemplary embodiments of the present invention, this and other objects are met by a method and apparatus for transmitting/re-transmitting packets in a communication system.

According to a first embodiment, a current transmission rate is determined, a sequence number is assigned to a packet for transmission based on the current transmission rate, the size of the packet, and a sequence number of a previously transmitted packet, and the packet is transmitted. The size of the packet is adapted so that he entire packet fits into a single transmission block at the current transmission rate.

According to a second embodiment, the size of a packet for transmission is adapted based on the throughput. The number of packets re-transmitted during a certain time period is determined, and this measurement is used to select the packet size that maximizes the throughput.

According to a third embodiment, a determination is made whether a packet is being re-transmitted. If not, the current transmission rate is determined, a sequence number is assigned to the packet, and the packet is transmitted as in the first embodiment. Otherwise, the packet is re-transmitted at its original rate.

BRIEF DESCRIPTION OF THE DRAWINGS

The features, objects, and advantages of the invention will become apparent by reading this description in conjunction with the accompanying drawings, in which like reference numerals refer to like elements and in which:

FIGS. 4A–4C illustrate exemplary error correction decoding;

DETAILED DESCRIPTION

According to exemplary embodiments of the invention, the packet size, sequence numbering, and/or transmission rate can be adapted to minimize packet re-transmission overhead in a communication system.

According to a first embodiment, a packet size can be chosen to minimize overhead. For example, the packet size can be chosen so that for every transmission rate, an entire packet fits into a transmission block. Thus, no extra overhead is wasted when transmitting at high transmission rates. In addition, the packets can be assigned sequence numbers in such a way the re-transmissions of erroneous packets can effectively be handled at different transmission rates.

The sequence number for a packet can be assigned based on the size of the information part (I-part) in the packet and the current transmission rate among a set of transmission rates. The amount of information that fits into the smallest packet can correspond to a sequence number increase of "1" (one unit). Thus, a sequence number for a packet having the smallest I-part can be assigned a step 1 greater than a previously assigned sequence number. Sequence numbers for larger packet sizes (with larger I-parts) can be chosen so re-transmissions can always be performed if the packet is corrupted or lost, i.e., if there is an error detected in the received packet, and the smallest rate within the rate set can be used for re-transmitting the entire I-part of the erroneous packet. This can be accomplished by re-arranging a long packet at the transmitter into several smaller packets. The smaller packets, except for those packets holding either the first or the last part of the original I-part, are then assigned new sequence numbers when they are re-transmitted. This is explained in more detail below with reference to FIGS. 3C and 3D.

Suppose that the size of the smallest I-part (corresponding to the sequence number increase of 1) that can be transmitted is $L_I$. Then, the following rules applies to the determination of the sequence number increase SEQ_INCREASE for any packet holding an I-part:

$$(\text{SEQ\_INCREASE}-1)*L_I < \text{size\_of(I-part)} \leq \text{SEQ\_INCREASE}*L_I \quad (1)$$

Thus, the following equation can be used to determine the increase of a sequence number for a packet of length current_size that has to be able to be re-transmitted on a channel with the transmission block of length of size L:

$$\text{SEQ\_INCREASE}=\lceil \text{current\_size}/L \rceil \quad (2)$$

where $\lceil \ \rceil$ is an operator that rounds the argument to the nearest higher integer value.

The sequence number for a packet will hereafter be denoted NS. This notation for a sequence number is commonly used in conventional ARQ systems based on the known High Level Data Link Control (HDLC) protocol.

Figure 3A:
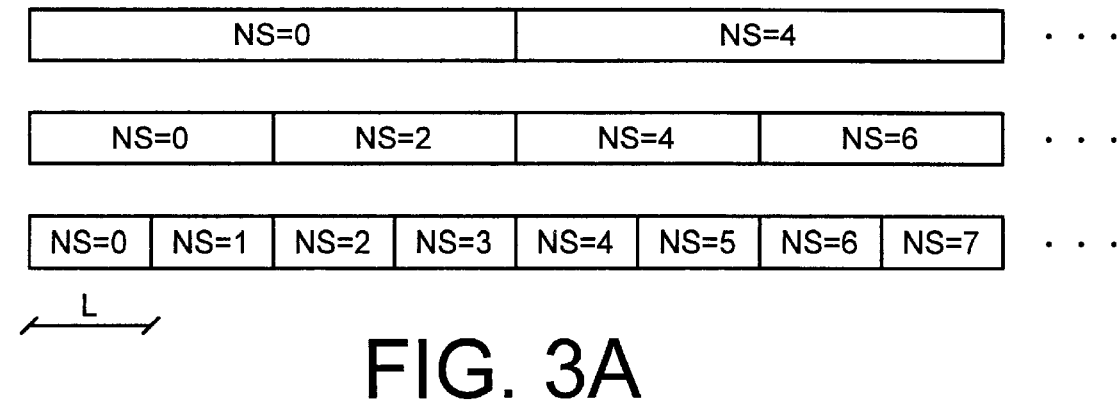
FIGS. 3A and 3B illustrate exemplary packet sequence numbering techniques according to a first embodiment.
Figure 3B:
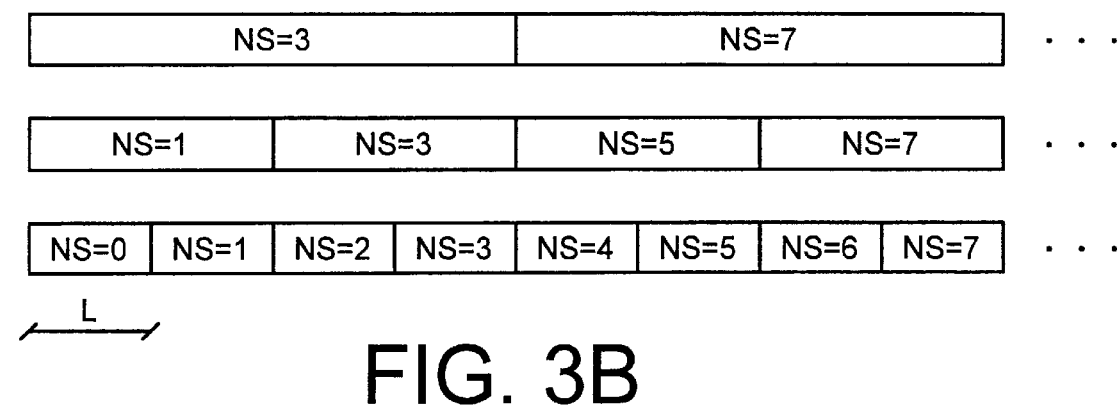

A packet having an I-part that is larger than the smallest packet size, corresponding to a sequence number increase of greater than 1 unit, can be assigned a sequence number in a number of ways, two of which are illustrated in FIGS. 3A and 3B.

In both FIGS. 3A and 3B, the packets in the first row represent the largest I-part. According to exemplary embodiments, these packets may be obtained, for example, by segmenting higher layer PDU frame blocks in a conventional manner. These packets may be stored, for example, in an intermediate buffer.

The packets in the first row are numbered 4 steps apart. For example, in FIG. 3A, the packets in the first row are numbered NS=0 and NS=4, and in FIG. 3B, the packets in the first row are numbered NS=3 and NS=7.

In the second row, the packets contain I-parts that are twice as large as the smallest I-part. These packets may be obtained, for example, by dividing the packets represented in the first row by two. The packets in the second row are numbered 2 steps apart. For example, in FIG. 3A, the packets in the second row are numbered NS=0, NS=2, NS=4, and NS=6. The packets in the second row in FIG. 3B are numbered NS=1, NS=3, NS=5, and NS=7.

In the third row, the packets contain I-parts that are the same size as the smallest I-part and are numbered consecutively. These packets may be obtained, for example, by dividing the packets represented in the second row by two. Thus, in both FIGS. 3A and 3B, the packets in the third row are numbered NS=1, NS=2, NS=3, . . . , NS=7.

For ease of explanation, the manner in which sequence number re-assigning is performed when a packet is to be re-transmitted at a lower transmission rate is explained with reference to FIG. 3B. Suppose that the packet assigned the sequence number NS=7 in the first row is to be re-transmitted on a channel which can only transmit packets at a rate ¼ of the rate with which packets in the first row can be transmitted. Then, the original packet assigned NS=7 can be divided into four packets which are numbered NS=4, NS=5, NS=6, and NS=7.

Figure 1:
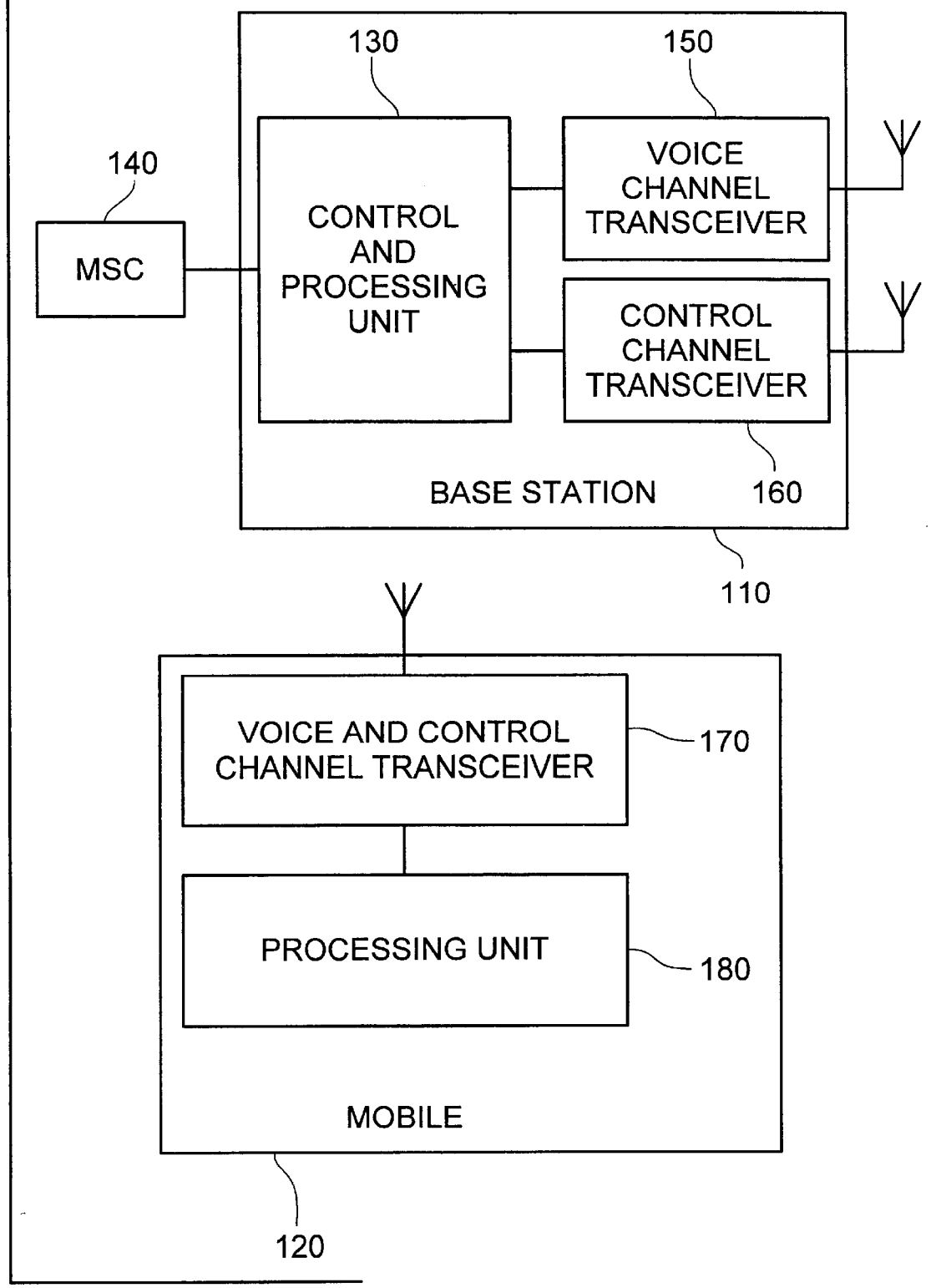
FIG. 1 is a block diagram of an cellular exemplary radiotelephone communication system.
Figure 2A:
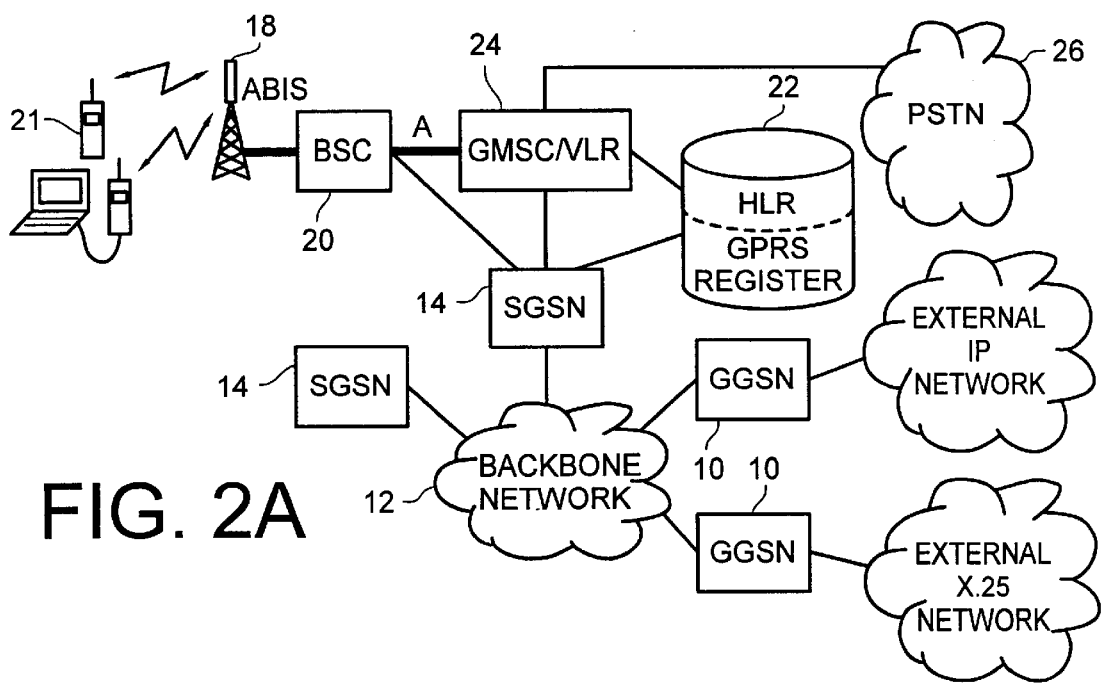
FIG. 2A illustrates a GSM/GPRS network architecture.
Figure 2B:
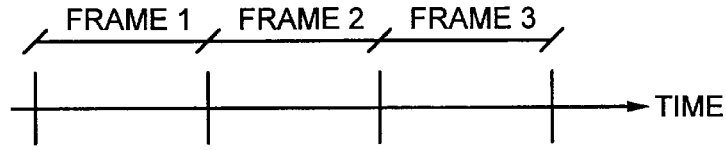
FIG. 2B illustrates a physical channel divided into frames.
Figure 2C:
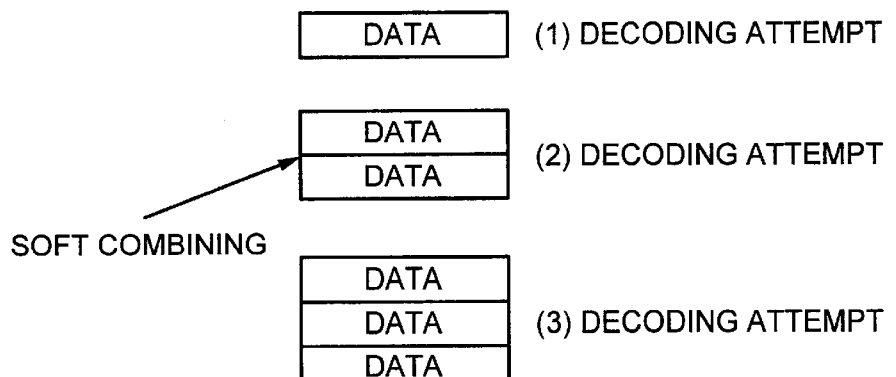
FIG. 2C illustrates a soft combining re-transmission scheme.
Figure 2D:
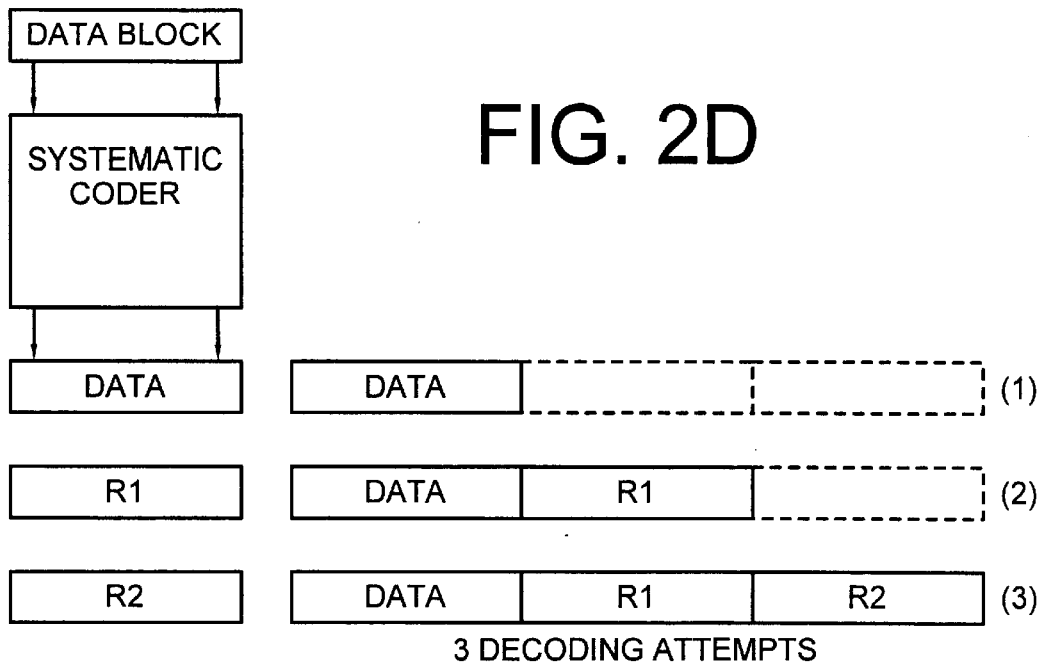
FIG. 2D illustrates a Type II hybrid re-transmission scheme.
Figure 3C:
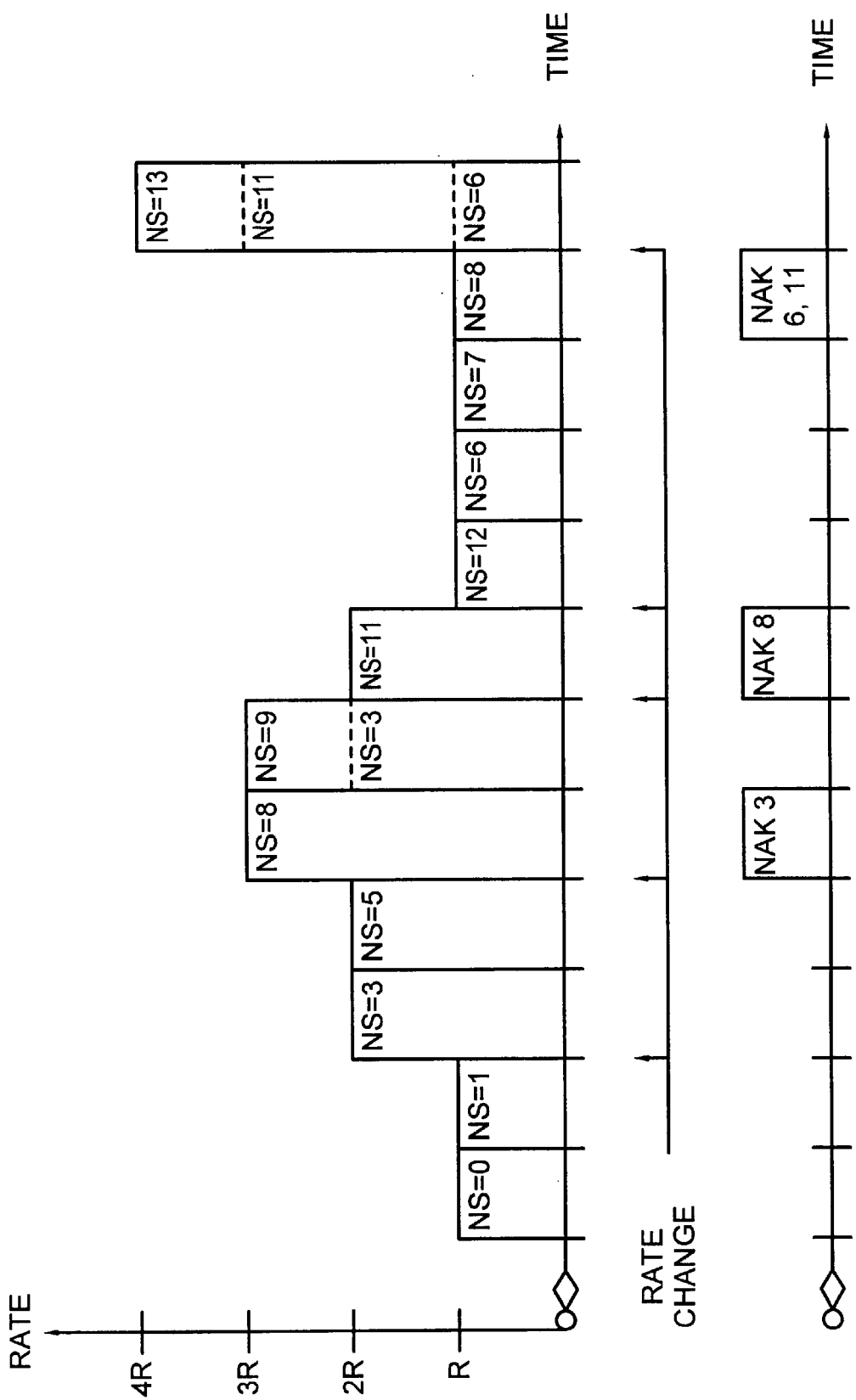
FIGS. 3C and 3D illustrate exemplary packet transmission/re-transmission in a channel according to the first embodiment.
Figure 3D:
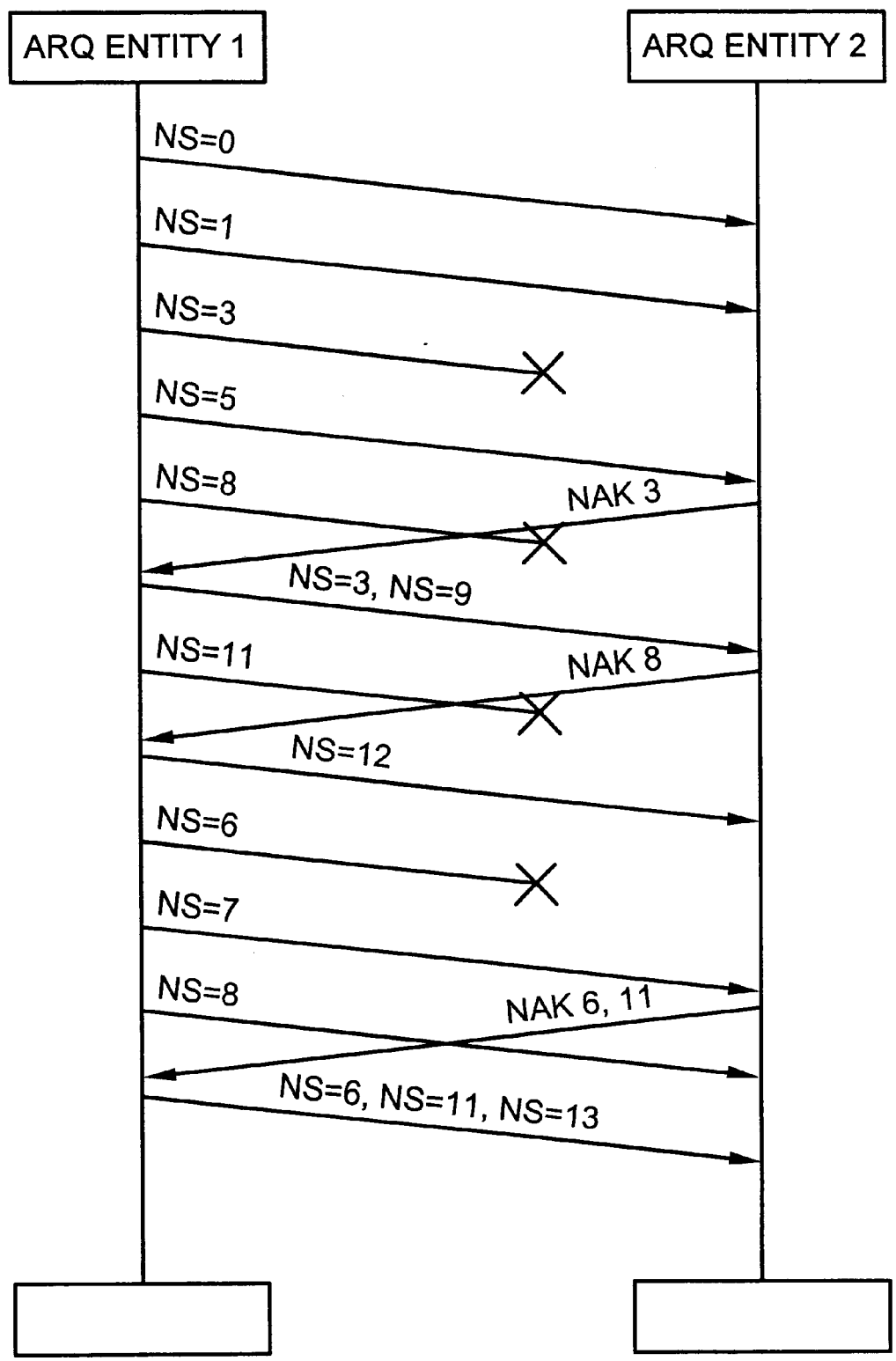

FIGS. 3C and 3D show an example of how packets are transmitted/re-transmitted in a channel at variable transmission rates according to a first embodiment of the invention. The packets are transmitted from a transmission entity, e.g., a mobile station, to a receiving entity, e.g., a base station, in transmission blocks. One or more packets are transmitted in each transmission block. A single transmission block is transmitted to the receiving entity during each time frame as described above with reference to FIG. 2B. The receiving entity detects errors in the received packets. For ease of description, the transmission entity and the receiving entity are represented in FIG. 3D as ARQ Entity 1 and ARQ Entity 2, respectively. Of course, it should be understood that both the ARQ Entity 1 and the ARQ Entity include transmission and reception capabilities.

In FIGS. 3C and 3D, the sequence number for a packet is denoted NS, and the transmission rate set is (R, 2R, 3R, 4R). The increase in the sequence number, i.e., the sequence number step, for a full size packet transmitted at these rates is (1, 2, 3, 4). In other words, at rate R, there is a difference in 1 between consecutively assigned sequence numbers, at rate 2R, there is a difference in 2 between consecutively assigned sequence numbers, etc.

In FIG. 3C, arrows indicate the moments at which rate changes occur. The rate changes are not shown in FIG. 3D, but the moments at which they occur can be deduced from the packet sequence numbering. The rate changes can be caused by, e.g., information sent to the transmission entity from the receiving entity. These rate changes can be performed in any conventional manner. FIGS. 3C and 3D also illustrates the reverse channel on which the requests for re-transmission of selected packets are transmitted.

The packet transmission begins in a first time frame at the rate R, with a corresponding sequence number step of 1. A first packet transmitted is assigned a sequence number 0. In the next frame, a packet transmitted is assigned a sequence number 1.

In the third frame, the rate changes to 2R, corresponding to a sequence number step of 2. The packet transmitted in this frame is assigned a sequence number 3 (a step of 2 greater than 1). This packet is lost on the channel, as can be seen in FIG. 3D, and an error is detected at the receiving entity. In the fourth frame, the next packet transmitted is assigned the sequence number 5 (a step of 2 greater than 3). A re-transmission request signal or Negative Acknowledgment (NAK), accompanied by the sequence number 3, is returned to the transmission entity in the following frame.

Also, in the fifth frame, the rate changes to 3R, corresponding to a sequence number step of 3. The packet transmitted in this frame is assigned a sequence number 8 (a step of 3 greater than 5). As shown in FIG. 3D, this packet is then lost on the channel, and an error is detected in the received packet.

Because the rate is great enough to transmit the packet with the sequence number 3, this packet is re-transmitted next. This leaves only enough room in the transmission block in this frame to transmit a packet of a size that could be transmitted at the rate R. Thus, a packet of this size is assigned the sequence number 9 (a step of 1 greater than 8) and is transmitted with the packet assigned sequence number 3.

An NAK signal is set to the transmitter in the following frame, along with the sequence number 8, to request re-transmission. Also, in the seventh frame, the rate changes to 2R, corresponding to a sequence number step of 2. Thus, the next packet transmitted is assigned the sequence number 11 (a step of 2 greater than 9).

Then, in the eighth frame, the rate changes to R, corresponding to a sequence number step of 1. Thus, the next packet transmitted is assigned a sequence number 12 (a step of 1 greater than 11).

In the ninth frame, the packet with the sequence number 8 is to be re-transmitted. However, the packet with the sequence number 8 includes three times the amount of information than can be transmitted in one transmission block at the rate R. Thus, the packet with the sequence number 8 is divided into three packets assigned sequence numbers 6, 7, and 8, respectively, and these packets are transmitted consecutively in the ninth, tenth, and eleventh frames.

As shown in FIG. 3D, the packets assigned sequence numbers 6 and 11 are lost on the channel, and an error is detected in the received packets. An NAK signal is sent to the transmission side along with the sequence numbers, during the eleventh frame.

In the twelfth frame, the rate changes to 4R, corresponding to a sequence number step of 4. At this rate, there is enough room in the transmission block to re-transmit the packet assigned the sequence number 6 and the packet assigned the sequence number 11, with enough room remaining to transmit a packet containing information that can be transmitted at a rate R. Thus, the next packet is assigned the sequence number 13 (a step of 1 greater than 12) and is transmitted in the same transmission block as the packets with the sequence numbers 6 and 11.

To simplify sequence numbering, if possible, two or more packets can be merged together into one and the multiple sequence numbers can be replaced with one. For example, referring to FIG. 3C, if the rate change message would have arrived just before the packet NS=7 was transmitted, indicating an allowed rate of 2R, then the I-parts of the NS=7 packet and the NS=8 packet could have been merged together and re-transmitted with the rate 2R including only the sequence number NS=8. This only applies to consecutively numbered packets. For example, the NS=3 packet and the NS=9 packet in FIG. 3C could not have been merged together when they were transmitted in the same transmission block because the I-parts were not consecutive.

Assigning sequence numbers in the manner described above solves the problem of how re-transmission is handled when a higher rate packet must be re-transmitted at a lower transmission rate. Transmission channel resources are not wasted on unnecessary overhead information. This increases the channel throughput.

In addition, adapting the packet size so that an entire packet fits into a transmission block further reduces overhead. As an illustrative example, consider a proposal for the developing IMT2000 WCDMA standard within ETSI and ARIB, in which there would be 10 msec time frames and different transmission rates within a rate set. Suppose that the rate set includes the transmission rates {32, 64, 128) kbit/s. This corresponds to a set of packet sizes of {320, 640, 1280) bits. Each RLCP packet holds a sequence number, some control bits, and a CRC, resulting in an overhead of approximately 32 bits for each RLCP packet. Using the conventional technique, the packet sizes will all be assigned the smallest packet size of 320 bits, and the packet sequence numbering will be incremented by one for each consecutive packet. Thus, at a rate of 32 kbit/sec, only one packet will be transmitted per time frame, and the resulting overhead will be 32 bits. At a rate of 64 kbit/sec, two packets will be transmitted per time frame, resulting in an overhead of 64 bits. At a rate of 128 kbit/sec, 4 packets will be transmitted per time frame, resulting in an overhead of 128 bits.

According to the first embodiment, the size of the packet can be adjusted, depending on the transmission rate, so that a single packet is transmitted in each transmission block. This will result in a constant overhead of 32 bits, regardless of the transmission rate. The throughput for the 64 Kb/s and the 128 Kb/s channels will increase by as much as 5.5% and 8.3%, respectively. It will be appreciated that this great an increase in throughput will only occur when the channel is error free. Otherwise, the throughput gain will be less because the re-transmitted packet sizes will be larger, thus lowering the throughput.

Figure 3E:
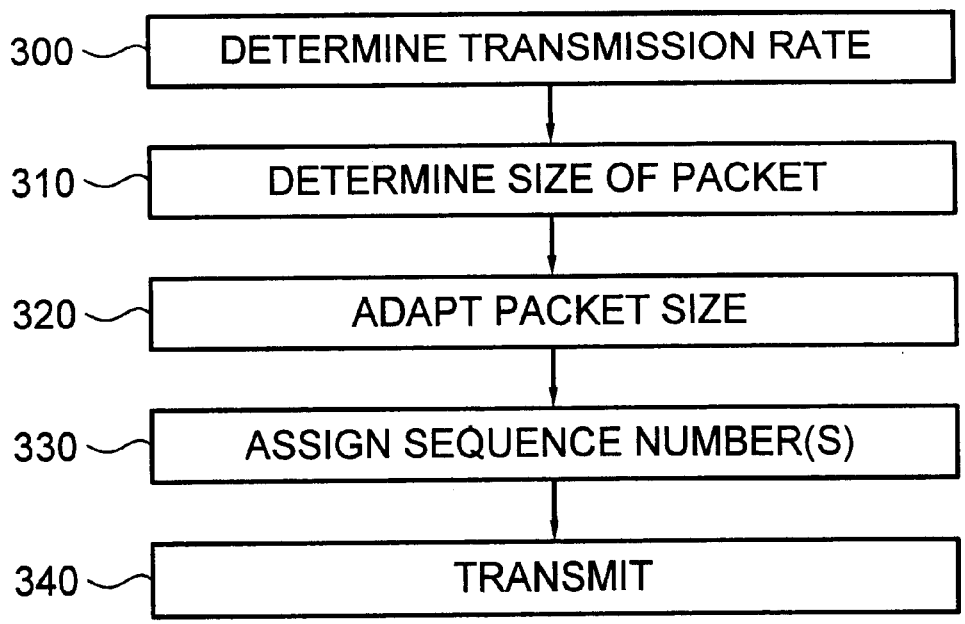
FIG. 3E illustrates a method for packet transmission/re-transmission according to the first embodiment.

FIG. 3E illustrates a method for packet transmission/re-transmission of a packet according to the first embodiment. At step 300, the transmission rate is determined, and at step 310 the size of the packet, e.g., the size of the I-part, is determined. It should be appreciated that these steps can also be performed in the reverse order. At step 320, the packet size is adapted so that the entire packet can fit into a single transmission block. At step 330, the packet (or packets, if the packet was divided into smaller packets at step 320) is assigned a sequence number. The packet (or packets) is then transmitted at step 340. This method is repeated for each packet transmitted and re-transmitted.

In addition to assigning sequence numbers to packets based on the amount of information in each packet and the transmission rate, according to a second embodiment of the invention, the packet size may be adapted to maximize throughput. According to this embodiment, a continuous measurement algorithm in, for example, a processor evaluates whether or not the current packet size is the best suited for the current channel conditions. For example, the algorithm measures the number of re-transmitted packets at the transmission entity during a certain time period and uses the measurements to adapt the packet size to achieve maximum throughput. A determination is made whether the throughput would be higher for a larger/smaller packet. If this is the case, then the packet size is increased/decreased, accordingly.

According to this embodiment, the throughput in the system is increased, and each ARQ entity can maximize its own throughput depending on the current channel conditions. The throughput measurements can be performed in a conventional manner. For example, suppose the rate set used is {32, 64, 128} kbit/s and suppose that the packet size set used is {320, 640, and 1280} bits. Also, suppose that the overhead for one packet is 40 bits. Suppose further that the transmission entity transmits at a rate of 128 kbit/s and uses a packet size of 640 bits, including the overhead. During a time period T, the transmission entity transmits a total number of 100 packets, including three re-transmitted packets. The throughput, denoted P, can be calculated as the number of useful bits successfully transmitted during time period T. The number of errors for the other packet sizes can be predicted to be the same, i.e., three errors for 200 packets of size 320 bits and 50 packets of size 1280 bits. The values for the throughput P for the various packet sizes can then be calculated as:

$$P_{320}=(320-40)*(2*100-3)/T=55160/T$$

$$P_{640}=(640-40)*(100-3)/T=58200/T$$

$$P_{1280}=(1280-40)*(100/2-3)/T=58280/T$$

Based on these calculations, the throughput is largest for a packet size of 1280 bits, $P_{1280}$. Thus, to maximize throughput, the transmitting entity can adapt the packet size to 1280 bits when transmitting at a rate of 128 kbit/s.

Figure 3F:
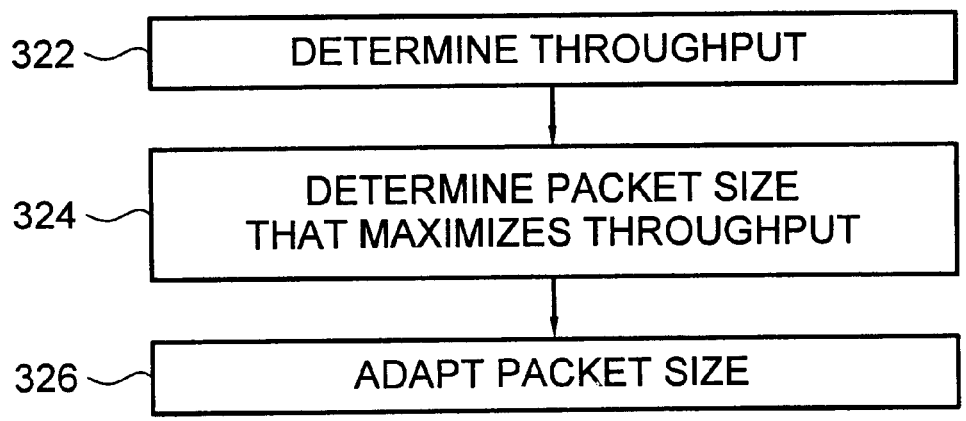
FIG. 3F illustrates a method for maximizing throughput according to the second embodiment.

FIG. 3F illustrates a method for maximizing throughput according to the second embodiment. This method may be performed as part of step 320 in FIG. 3E. At step 322, the throughput is determined. At step 324, a packet size that maximizes the throughput is determined. At step 326, the packet size is adapted to maximize throughput.

For error detection, a CRC is appended to the packets. For example, one CRC may be included in each transmission block. In such a case, there is only one CRC for error detection for the entire transmission block. When a transmission block includes more than one packet, each packet assigned a different sequence number, there must be additional signaling between the transmitting entity and the receiving entity to inform the receiving entity where the different packets are situated inside the transmission block. For this purpose, the sequence numbers of the packets within a block can be included inside the block header and, if needed, a length indicator can also be included that informs the receiving entity of the length of the I-part which corresponds to each particular sequence number. Using this method, CRC checking can be done for each transmission block at the receiving entity.

Alternately, a CRC may be included in each packet assigned a different sequence number. For example, referring to FIG. 3C, when transmitting the packets in the twelfth frame, each packet can hold a CRC value, i.e., three CRCs can be transmitted within the transmission block. This requires some extra processing at CRC checking by the receiving entity. This is described in detail below.

The receiving entity does not know how the entire transmission block is protected by the CRC when the block is received. The receiving entity only knows the length of the entire transmission block, which is denoted L. The size of a packet is referred to as $A_i$, where i=1, . . . , M, and M is a finite value, i.e., there are a limited number of packet sizes. The packet sizes may be grouped in increasing order, i.e., $A_1<A_2<, \ldots ,<A_M$. For a block of length L, the following rule applies for each transmission block:

$$L=\Sigma A_i \qquad (3)$$

for the finite number of packets $A_i$ in each block. The order in which the packets are placed in a particular transmission block is arbitrary. For example, referring to FIG. 3C, the packets transmitted in the twelfth frame can be arranged in 3!=6 different ways in the block: {6,11,12}, {6,12,11}, {11,6,12}, {11,12,6}, {12,6,11}, and {12,11,6}.

Suppose a transmission block has the length L of 10 units, and the set of different possible packet sizes is {1,2,4,5,6,10} according to the rate set used. The transmission block can then comprise various combinations of packets of different sizes, e.g., [2,2,2,2,2], [5,2,2,1], [10], [6,4], etc.

According to an exemplary embodiment, the CRC check starts with a check for a CRC-OK of a packet having the smallest size within the set of possible sizes. A CRC-OK indicates that no errors are detected in the received packet. If the check of the packet having the smallest size does not result in a CRC-OK, then the next packet size will be checked, and so forth, until the largest packet size has been checked. If no CRC-OK is obtained when the largest possible packet size has been checked, the procedure is repeated, starting after the end of the smallest packet size in the data block, i.e., after $A_1$, and continuing until the end of the block. Only packets having sizes that will fit into the remaining sub-block, after the end of the packet $A_1$, to the end of the transmission block, are checked. If this first sub-block does not result in a CRC-OK, the start position is moved to after the end of the second smallest packet size, $A_2$. The remaining sub-block of the transmission block is checked as before. When a CRC-OK is obtained, the sub-block is released, and a new search starts again with the smallest packet size and continues until the entire data block has been checked.

Figure 4A:
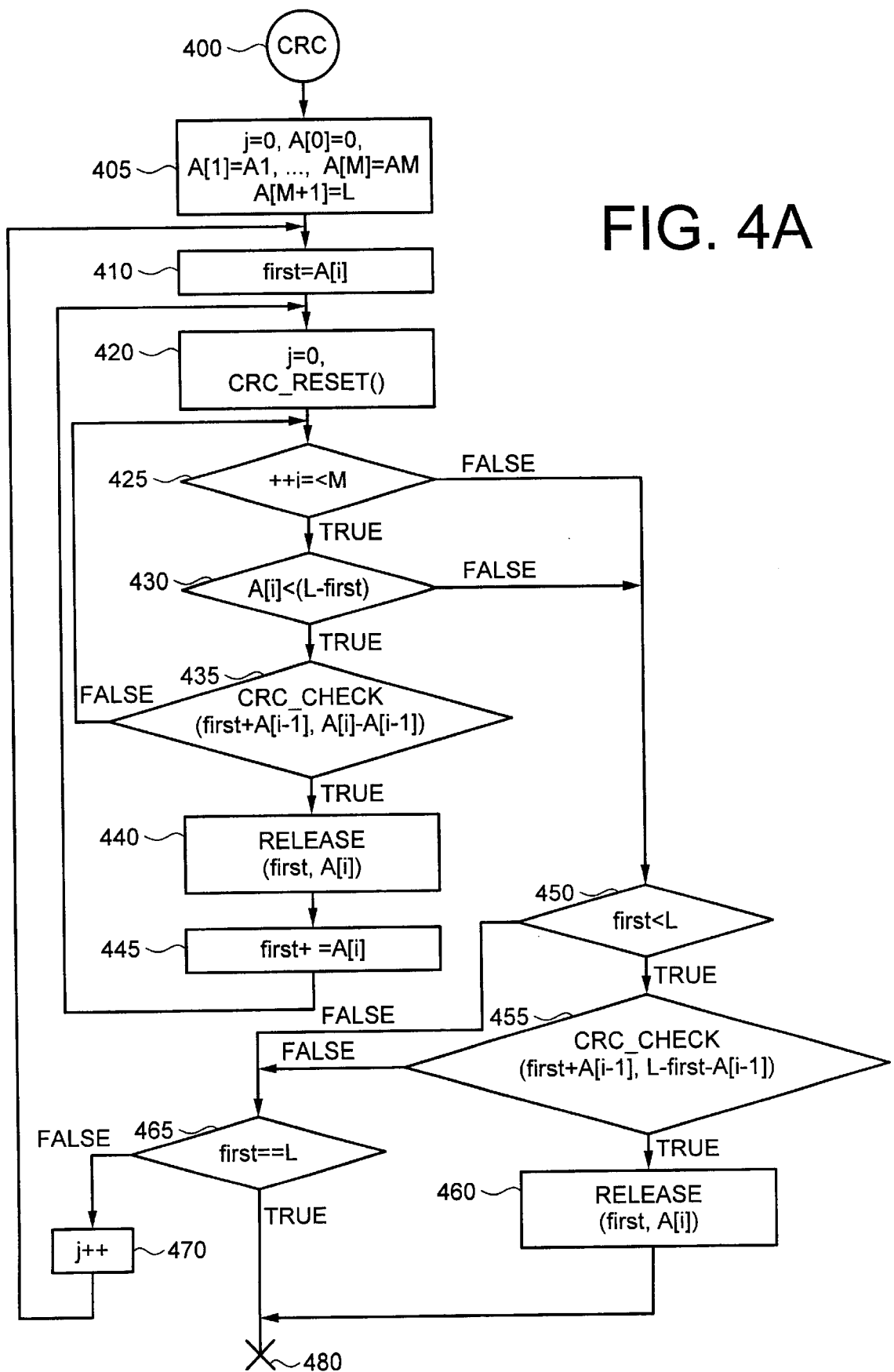

This process is illustrated in FIG. 4A which shows a flow chart of how a CRC decoding algorithm for a transmission block can be implemented. The notation used in FIG. 4A is based on C programming language syntax, but the invention is not limited to a C programmed implementation.

The process starts at step 400 at which an order for CRC decoding is issued, e.g., by a processor in the receiving entity. At step 405, packet size variables and process variables are initialized. At step 410, the variable "first" is set equal to the packet size A[j]. Next, at step 420, the process variable "i" is set equal to zero, and the CRC register set to a predefined value, e.g., 1's or 0's. Next, at step 425, i is incremented by 1, and a determination is made whether i is less than or equal to M, where M is the number of possible packet sizes. At step 430, a determination is made whether the ith packet size is less than L-first, i.e., whether the ith packet with size A[i] fits into the sub-block of the transmission block, excluding the packet with the length of the variable first. If this is true, a determination is made at step 435 whether a CRC OK is obtained for a sub-block of the transmission block that is the size of packet size A[i] minus A[i−1], starting at an offset of the variable first plus the packet size A[i−1]. If not, the process returns to step 425. If so, then the sub-block is released at step 440, and the variable first is incremented by the size of the ith packet at step 445. From there, the process returns to step 420.

If, at step 425, ++i is determined not to be less than or equal to M, then a determination is made at step 450 whether first is less than L. If so, a determination is made at step 455 whether a CRC OK is obtained for the sub-block of the transmission block that is the size of L-first-A[i−1], starting at an offset of the variable first plus the packet size A[i−1]. If so, then that sub-block is released at step 460. If, at step 450, first is determined not to be less than L, or at step 455 no CRC OK is obtained, a determination is made at step 465 whether first is equal to L. If not, then j++, i.e., j is incremented by 1, at step 470, and the process returns to step 410. If first is determined to equal L at step 465, i.e., the end of the transmission block has been reached, or if the sub-block is released at step 460, the process ends at step 480.

The CRC check can be made using a linear feedback shift register (LFSR) either implemented in hardware or software. The bit stream to be checked for a CRC OK can be run through the LFSR. The function CRC_Check (arg1, arg2) in steps 435 and 455 corresponds to checking an amount of arg 2 data units starting at position arg 1 of the data unit stream run through the LFSR. The data unit may be, for example, bits or bytes. The function CRC_CHECK( ) then returns TRUE if the resulting register values are valid and FALSE if they are invalid.

As an example of how CRC decoding works, consider a set of packet sizes {320,480,640} bits and a transmitted block size having a size L equal to 640 bits as depicted in FIG. 4B. Assume that the transmission block to be checked comprises two packets with a size of 320 bits each and that the first packet is erroneous, i.e., it will not result in a valid CRC check. FIG. 4C illustrates the steps for CRC decoding, based on these assumptions.

Referring to FIG. 4C, at step 405 the process variable j is set to zero, and the packet size variables A[0], A[1], A[2], A[3], and A[4] are set to 0, 320, 480, 640, and 640, respectively. At step 410, the process variable first is set to zero. At step 420, the process variable i is set to zero, and the CRC register is reset.

At step 425, i is incremented by 1, and it is determined that i (1) is less or equal to than M (3). At step 430, it is determined that A[1] (320) is less than L-first (640). Next, at step 435, the first 320 bits of the block are checked, and it is determined that a CRC OK is not obtained for this 320 bits checked. Step 425 is then repeated, and i+1 (2) is determined to be less than or equal to M (3). At step 430, A[2] (480) is determined to be less than L-first (640). At step 435, a sub-block is checked containing 160 bits, offset 320 bits from the beginning of the block, and it is determined that a CRC OK is not obtained for the total 480 bits of the block checked. Then, step 425 is repeated, and it is determined that A[3] (3) is less than or equal to M (3). At step 430, A[3] (640) is determined not to be less than L-first (640). Thus, step 450 is performed and first (0) is determined to be less than L (640). Next, at step 455 a sub-block containing 160 bits, offset 480 bits from the beginning of the block is checked, and it is determined that a CRC OK is not obtained for the total 640 bits of the block checked. Then, at step 465, it is determined that first (0) is not equal to L (640), and j is set equal to 1 at step 470.

Next, step 410 is repeated, and first is set equal to 320. Next, at step 420, i is reset to 0, and the CRC register is reset. Then, at step 425, i is incremented by 1, and then i is determined to be less than or equal to M (3). At step 430, A[1] is determined not to be less than L-first (320), and at step 450, first (320) is determined to be less than L (640). At step 455, it is determined that a CRC OK is obtained for a sub-block containing 320 bits, offset 320 bits from the beginning of the block. This sub-block is released at step 460, and the process ends at step 480.

While the embodiments described above have the advantages of low overhead and increased throughput, according to a third embodiment, the packet size may be adapted so that each transmission block only contains one RLCP to support Type II and Type III hybrid ARQ and soft combining. This allows the receiving entity to combine newly transmitted information with the previously transmitted information in order to increase the probability of successful decoding.

To support Type II and Type III hybrid ARQ and soft combining, according to the third embodiment, the packet size is only adapted for the original transmission, and all re-transmissions of the same packet are performed at the original transmission rate. The reason for this is that if the rate were allowed to change on re-transmission, the information re-transmitted within one transmission block would be different than the information originally transmitted within a transmission block. This would make the Type II and Type III hybrid ARQ and soft combining prohibitively complex.

Figure 5A:
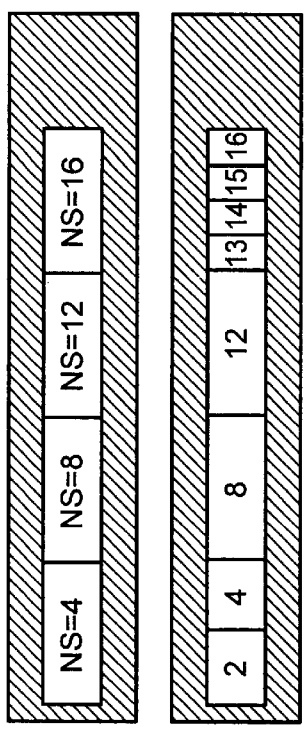
FIG. 5A illustrates exemplary packet sequence numbering according to a third embodiment.

FIG. 5A illustrates packet sequence numbering according to a third embodiment. Sequence numbering, according to the third embodiment, is similar to that in the first and second embodiments, at least for the original transmission of packets. In FIG. 5A, the packets in the first row have information parts that are four times larger than the smallest I-part. These packets are assigned sequence numbers 4, 8, 12, and 16, respectively. The packets in the second row illustrate how the packets are actually transmitted.

For example, suppose that the packet assigned the sequence number NS=4 in the first row is to be transmitted on a channel which can only transmit packets at a rate ½ of the rate with which packets in the first row can be transmitted. Then, the original packet assigned NS=4 can be divided into two packets which are numbered NS=2 and NS=4. Suppose that the packet assigned the sequence numbers NS=8 and NS=12 in the first row are to be transmitted on a channel which can transmit packets at the same rate as the packets in the first row. Then, these packets do not have to be divided for transmission. Suppose that packet assigned the sequence number NS=16 in the first row is to be transmitted on a channel which can only transmit packets at a rate ¼ of the rate with which packets in the first row can be transmitted. Then, the original packet assigned NS=16 can be divided into four packets numbered NS=13, NS=14, NS=15, and NS=16.

Figure 5B:
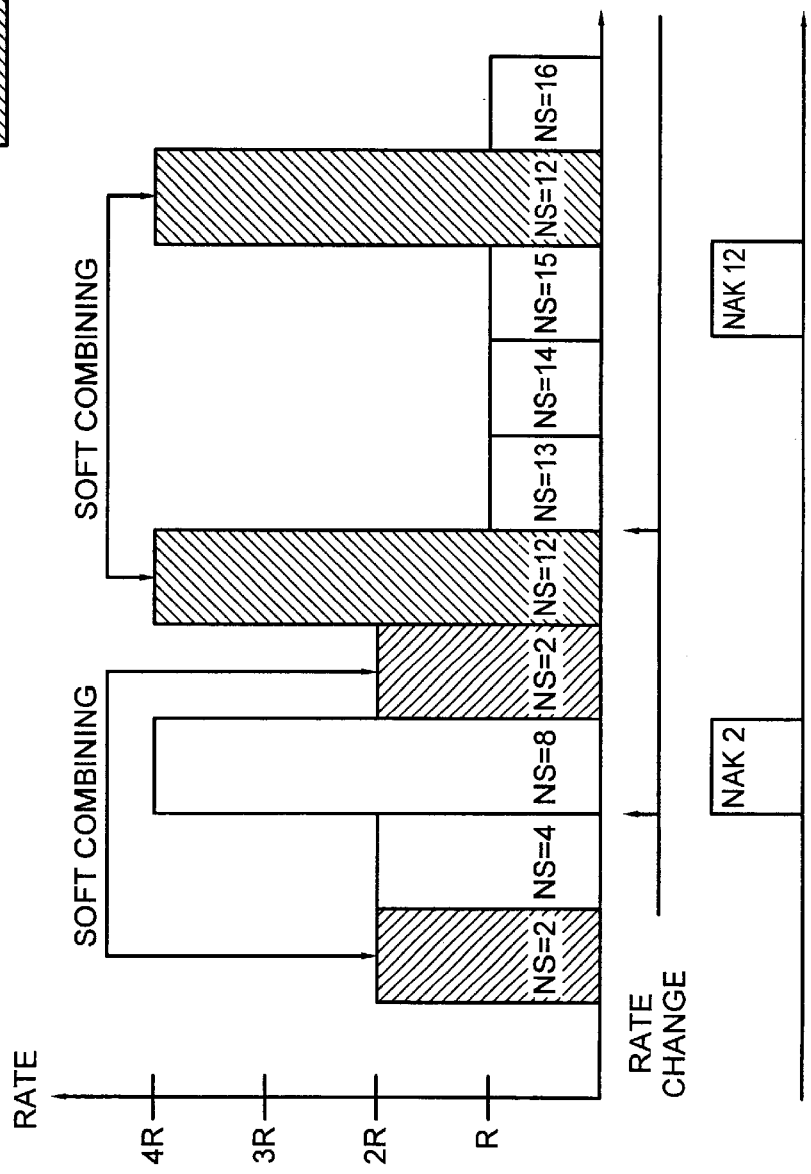
FIG. 5B illustrates packet transmission/re-transmission in a channel according to the third embodiment.

FIG. 5B illustrates exemplary transmission/re-transmission according to the third embodiment. In FIG. 5B, one transmission packet is transmitted in each time frame. Arrows indicate rate changes. Although described with reference to soft combining, it will be appreciated that this can be extended to Type II and Type III hybrid ARQ schemes as well as other variable redundancy schemes.

In FIG. 5B, the rate set is {R, 2R, 3R, 4R}. At the maximum rate, the set of packet sequence numbers is {4, 8, 12, 16}. When transmission begins, the rate is 2R, which is half the maximum rate. Thus, the first packet is segmented into two packets numbered 2 and 4. The packet with the sequence number 2 is transmitted in the first frame at a rate 2R. In the next frame, the packet with the sequence number 4 (a step of 2 greater than 2) is transmitted. An error is detected in the received packet with the sequence number 2, and an NAK signal, accompanied by the sequence number 2, is sent to the transmitting entity in the third frame. Also, in the third frame, the rate changes to 4R, and the packet assigned the sequence number 8 (a step of 4 greater than 4) is transmitted.

In the fourth frame, the packet with the sequence number 2 is re-transmitted at the rate 2R, which is the original rate of transmission of this packet. This transmission is soft combined with the previous transmission in the receiving entity, and the packet is successfully decoded.

In the fifth frame, a packet assigned the sequence number 12 (a step of 4 greater than 8) is transmitted. Then, the rate changes to R, and the rate remains fixed for the next three frames. Thus, the packet with the sequence number 16 is divided into four packets assigned sequence numbers 13, 14, 15, and 16. The packets assigned the consecutive sequence numbers 13, 14, and 15 are transmitted in the sixth, seventh, and eighth frames, respectively. An error is detected in the received packet with the sequence number 12, and an NAK signal is transmitted to the transmission entity, along with the sequence number 12, during the eighth frame. In the ninth frame, the packet assigned the sequence number 12 is re-transmitted at its original rate of transmission, 4R. Next, in the tenth frame, a packet assigned the sequence number 16 (a step of 1 greater than 15) is transmitted.

Figure 5C:
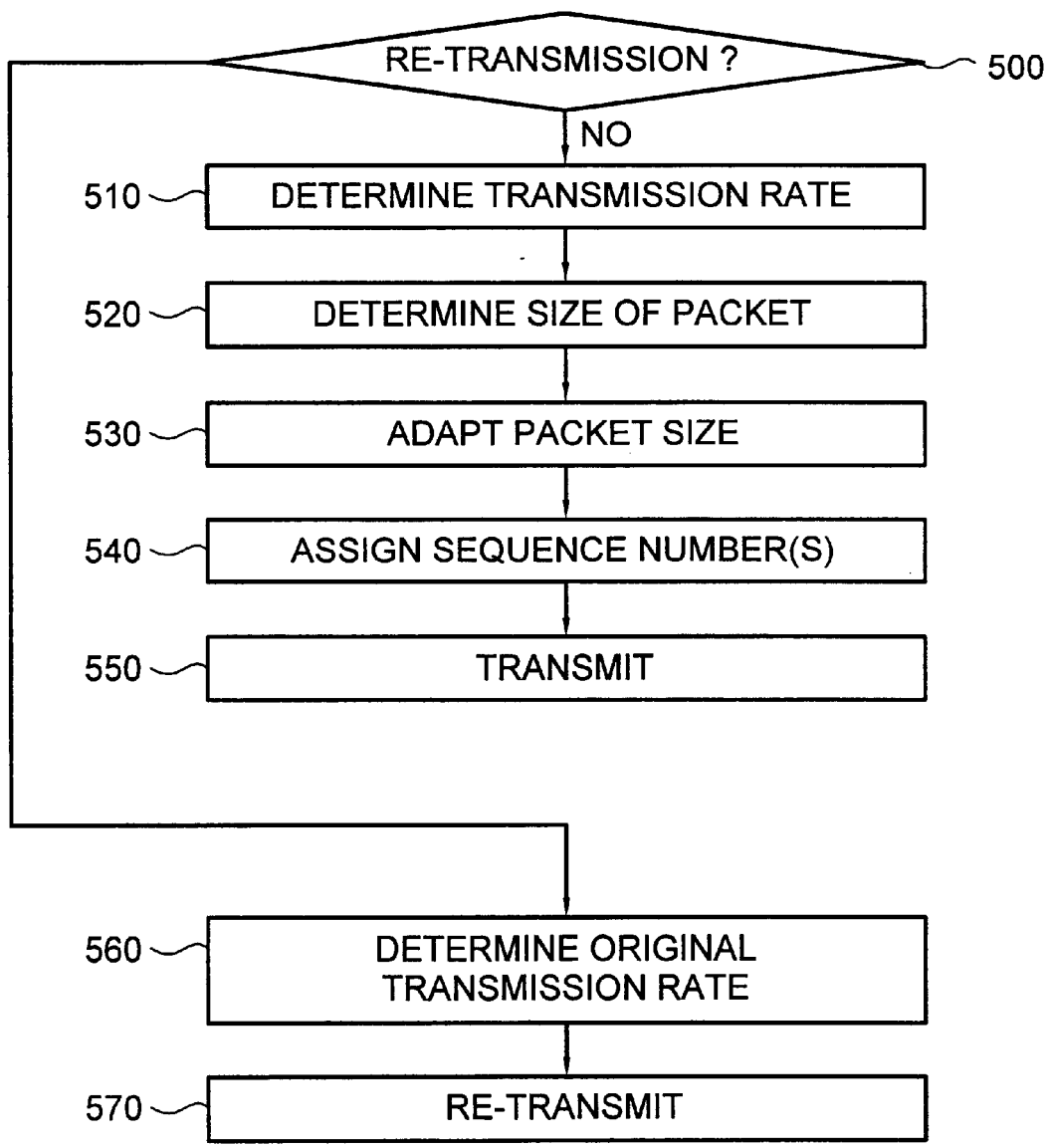
FIG. 5C illustrates a method for packet transmission/re-transmission according to the third embodiment.

FIG. 5C illustrates a method for packet transmission/re-transmission according to the third embodiment. The method begins at step 500 at which a determination is made whether a packet is being re-transmitted. If not, the process proceeds to steps 510, 520, 530, and 540 at which the transmission rate is determined, the size of the packet is determined, the packet size is adapted, a sequence number (or sequence numbers) is assigned, and the packet (or packets) is transmitted, respectively, in a manner similar to steps 300–340 shown in FIG. 3E. If, at step 500, it is determined that the packet is being re-transmitted, the process proceeds to step 560 at which the original transmission rate is determined. The packet is re-transmitted at this rate at step 570.

The technique according to the third embodiment has many advantages, including low overhead, since only one header and one CRC are required for each packet. Also, this makes it easier to perform soft combining and Type II and Type III hybrid ARQ. Over-dimensioned packet sequence numbers may result in cases when the intermediate sequence numbers remain unused, but this is very limited in terms of overheads, e.g., two extra bits for a sequence numbering step of four.

All the processes for sequence numbering, packet size adaptation, and transmission rate varying described above can be performed, for example, in a processor in a transceiver.

Although described in an application to a CDMA system, it will be appreciated by those of ordinary skill in the art that this invention can be embodied in other specific forms, e.g., a TDMA system or a hybrid CDMA-TDMA system, without departing from its essential character. The embodiments described above should therefore be considered in all respects to be illustrative and not restrictive.

What is claimed is:

1. A method for transmitting packets in a communication system, the method comprising the steps of:
    determining a current transmission rate;
    assigning a sequence number to a packet for transmission based on the current transmission rate, the size of the packet, and a sequence number of a previously transmitted packet; and
    transmitting the packet at the current transmission rate.

2. The method of claim 1, further comprising:
    adapting a packet size so that the entire packet fits into a single transmission block at the current transmission rate.

3. The method of claim 2, wherein the step of adapting further comprises:
    determining whether the packet for transmission is the same size as a packet that can be transmitted in a single transmission block at the current transmission rate; and
    if the packet is larger, dividing the packet for transmission into smaller packets.

4. The method of claim 3, further comprising, if the packet for transmission is smaller than a packet that can be transmitted in a single transmission block, adding additional packets in the transmission block.

5. The method of claim 1, further comprising:
    receiving a transmitted block including one or more packets;
    detecting errors in the one or more packets; and
    re-transmitting any of the one or more packets included in the block in which there are detected errors, wherein if, at the time of re-transmission, the transmission rate is lower than the rate at which the packets were originally transmitted, the packet is divided into smaller packets, and the smaller packets are reassigned sequence numbers.

6. The method of claim 5, wherein the step of detecting comprises:
    checking the one or more packets of the transmitted block for errors; and
    releasing those packets of the transmitted block in which there are no detected errors.

7. The method of claim 5, further comprising a step of adapting a packet size to maximize throughput based on a number of packets re-transmitted during a certain time period.

8. The method of claim 1, further comprising the steps of:
    determining whether a packet is being re-transmitted, wherein if the packet is not being re-transmitted, the steps of determining the current transmission rate, assigning a sequence number, and transmitting the packet at the current transmission rate are performed, or if the packet is being re-transmitted, the packet is re-transmitted at its original transmission rate.

9. A transceiver comprising:
    a processor for determining a current transmission rate and assigning a sequence number to a packet for transmission based on the current transmission rate, the size of the packet, and a sequence number of a previously transmitted packet; and a transmitter for transmitting the packet at the current transmission rate.

10. The transceiver of claim 9, wherein the processor adapts the packet size so that the entire packet fits into a single transmission block at the current transmission rate.

11. The transceiver of claim 10, wherein the processor determines whether the packet for transmission is the same size as a packet that can be transmitted in a single transmission block at the current transmission rate, and if the packet is larger, the processor divides the packet for transmission into smaller packets.

12. The transceiver of claim 11, wherein if the packet for transmission is smaller than a packet that can be transmitted in a single transmission block, the processor adds additional packets in the transmission block.

13. The transceiver of claim 9, wherein the transmitted block is received and the processor detects errors in the transmitted block, and if any errors are detected in the transmitted block, the transmitter re-transmits packets in which there are detected errors, and wherein if, at the time of re-transmission, the transmission rate is lower than the rate at which the packets were originally transmitted, the processor divides the packet into smaller packets and reassigns sequence numbers to the smaller packets.

14. The transceiver of claim 13, wherein the processor detects errors by checking packets of the transmitted block for errors and releasing those packets of the transmitted block in which there are no detected errors.

15. The transceiver of claim 14, wherein the processor adapts a packet size to maximize throughput based on a number of packets re-transmitted during a certain time period.

16. The transceiver of claim 9, wherein the processor determines whether a packet is being re-transmitted, and wherein if the packet is not being re-transmitted, the processor determines the current transmission rate and assigns the sequence number and the transmitter transmits the packet, or if the packet is being re-transmitted, the transmitter re-transmits the packet at its original transmission rate.

* * * * *